United States Patent
Kudo et al.

(10) Patent No.: US 6,319,483 B1
(45) Date of Patent: Nov. 20, 2001

(54) GALLIUM AND/OR INDIUM SEPARATION AND CONCENTRATION METHOD

(75) Inventors: Yoshito Kudo; Yukiko Maruyama, both of Tokyo (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/481,506

(22) Filed: Jan. 12, 2000

(30) Foreign Application Priority Data

Jan. 14, 1999 (JP) .................................................. 11-008339
Sep. 29, 1999 (JP) .................................................. 11-276151

(51) Int. Cl.⁷ .......................... C22B 58/00; C22B 21/00; C22B 61/00; C22B 7/00; C25C 1/22
(52) U.S. Cl. .......................... 423/127; 423/147; 205/564
(58) Field of Search .................................... 423/147, 127; 205/564; 75/711

(56) References Cited

U.S. PATENT DOCUMENTS

| 2,574,008 | 11/1951 | Beja . |
| 3,684,490 | 8/1972 | Steinviet . |
| 4,071,422 | 1/1978 | Charlton et al. . |
| 4,986,969 | 1/1991 | Tanihara . |

FOREIGN PATENT DOCUMENTS

| A 59-193230 | 11/1984 | (JP) . |
| 88/03912 | 6/1988 | (WO) . |

OTHER PUBLICATIONS

Dutrizac, et al., "The Behavior of Impurities during jarosite precipitation," Miner. Sci. Lab., CANMET Energy, Mines Resour. Canada, Ottawa, ON, NATO Conf. Ser., 6, 10(Hydrometall. Process Fundam.), pp. 125–169, 1984.*
Dutrizac, et al., "Behavior of indium during jarosite precipitation," Publ. Australas. Inst. Min. Metall. 7/93(World Zinc '93), pp. 365–372, Oct. 1993.*
Dutrizac, et al., "The behavior of gallium during jarosite precipitation," Can. Metall. Q., 39(1), pp. 1–14, Jan. 2000.*

* cited by examiner

Primary Examiner—Steven Bos
(74) Attorney, Agent, or Firm—Oliff & Berridge, PLC

(57) ABSTRACT

It is possible to recover gallium and indium efficiently and at a low cost from solutions containing traces of gallium and indium. In particular, jarosite is produced by performing a specific treatment on a solution obtained by a two-stage neutralization treatment during the zinc leached residue treatment step of wet zinc refining, or on another solution containing traces of gallium and indium; the gallium and indium are separated and concentrated; an alkali is added to the jarosite; and the gallium is separated and concentrated by leaching. Calcium hydroxide or magnesium hydroxide is optionally added to the jarosite leached solution to perform purifying, sulfuric acid is added to the purified solution, neutralization is performed, basic gallium sulfate is precipitated, the precipitate is subjected to alkali leaching, and the gallium in the leached solution is electrolytically extracted, yielding metallic gallium.

12 Claims, 7 Drawing Sheets

TABLE 1. IRON (III) ION CONTENT AND PRECIPITATION RATIO(%)

| Fe(III)(g/l) | K+(g/l) | Ga | In | Al | Zn |
|---|---|---|---|---|---|
| 0.2 | 2.5 | 61 | 25 | 7 | 0 |
| 4.0 | 2.5 | 92 | 59 | 15 | 4 |

TABLE 2. MONOVALENT CATION CONTENT AND PRECIPITATION RATIO(%)

| K+(g/l) | Fe(III)(g/l) | Ga | In | Al | Zn |
|---|---|---|---|---|---|
| 0.3 | 2.0 | 51 | 21 | 6 | 0 |
| 3.0 | 2.0 | 97 | 68 | 21 | 3 |

TABLE 3. JAROSITE PULP CONCENTRATION AND PRECIPITATION RATIO(%)

| PULP CONCENTRATION(g/l) | REACTION TIME (h) | Ga | In | Al | Zn |
|---|---|---|---|---|---|
| 102 | 4 | 83 | 63 | 9 | 0 |

TABLE 4. COMPOSITION OF INITIAL JAROSITE FOR LEACHING

| Ga(%) | In(%) | Al(%) | Fe(%) | Zn(%) |
|---|---|---|---|---|
| 1.51 | 2.11 | 8.86 | 10.34 | 0.16 |

TABLE 5. DIFFERENCES IN LEACHING RATIO BASED ON LEACHING REAGENT

| REAGENT | CONCENT-RATION | TEMPERA-TURE | LEACHING TIME | LEACHING RATIO (%) | | | | |
|---|---|---|---|---|---|---|---|---|
| | | | | Ga | In | Al | Fe | Zn |
| SULFURIC ACID | 200g/L | 80°C | 2Hr | 31.2% | 34.2% | 30.6% | 33.3% | 34.2% |
| HYDROCH-LORIC ACID | 200g/L | 80°C | 2Hr | 38.4% | 39.4% | 33.6% | 33.5% | 26.5% |
| CAUSTIC SODA | 200g/L | 80°C | 2Hr | 100.0% | 0.0% | 76.3% | 0.0% | 0.3% |

FIG.5

PURIFICATION OF LEACHED SOLUTION OF Ga-, In-CONTAINING JAROSITE
(REMOVAL OF Al, Zn)

TABLE 6. LEACHED SOLUTION CONCENTRATION

| Ga(mg/L) | In(mg/L) | Al(mg/L) | Fe(mg/L) | Zn(mg/L) |
|---|---|---|---|---|
| 720 | 0.0 | 5.111 | 0.0 | 209 |

60g CALCIUM HYDROXIDE ADDED PER LITER OF LEACHED SOLUTION. LEACHED SOLUTION PURIFIED (FREED FROM Al, Zn) BY REACTING FOR 2 HOURS AT 80°C AND DIVIDING INTO SOLID AND LIQUID FRACTIONS.

TABLE 7. PURIFIED SOLUTION

| Ga(mg/L) | In(mg/L) | Al(mg/L) | Fe(mg/L) | Zn(mg/L) |
|---|---|---|---|---|
| 720 | 0.0 | 750 | 0.0 | 47 |

FIG.6

TABLE 8. AMOUNT OF CALCIUM HYDROXIDE ADDED, AND ALUMINUM REMOVAL RATIO

| ADDITIVE REAGENT | CONCENTRATION OF PURIFIED SOLUTION | | PRECIPITATION RATIO | |
|---|---|---|---|---|
| $Ca(OH)_2$ | [Ga] | [Al] | Ga | Al |
| g/L | g/L | g/L | % | % |
| 0 | 4.09 | 11.23 | 0.0% | 0.0% |
| 20 | 4.16 | 8.28 | -1.8% | 26.2% |
| 40 | 3.96 | 4.74 | 3.1% | 57.8% |
| 60 | 4.19 | 1.97 | -2.5% | 82.5% |
| 80 | 4.16 | 0.91 | -1.8% | 91.9% |
| 100 | 3.99 | 0.56 | 2.4% | 95.1% |
| 120 | 4.00 | 0.62 | 2.1% | 94.5% |

TABLE 9. TEMPERATURE DEPENDENCE OF PURIFICATION REACTION

| TEMPERATURE | Al |
|---|---|
| ℃ | PRECIPITATION RATIO |
| 20 | 31.2% |
| 60 | 88.9% |
| 80 | 94.5% |

FIG.7

TABLE 10. REMOVAL OF Ge DEPENDING ON AMOUNT OF MAGNESIUM HYDROXIDE ADDED

| ADDITIVE REAGENT | PURIFIED SOLUTION |
|---|---|
| $Mg(OH)_2$ | [Ge] |
| g/L | mg/L |
| 0 | 43.0 |
| 10 | 16.0 |
| 20 | 8.5 |
| 50 | 3.2 |

FIG.8

FORMATION OF Ga-CONCENTRATED RESIDUE FROM PURIFIED SOLUTION

TABLE 11. CONCENTRATION OF PURIFIED SOLUTION

| Ga(mg/L) | Al(mg/L) | Fe(mg/L) | Zn(mg/L) |
|---|---|---|---|
| 911 | 652 | 0.32 | 123 |

TABLE 12. NEUTRALIZATION pH AND RESIDUE COMPOSITION

| NEUTRALI-ZATION REAGENT | NEUTRALI-ZATION pH | SOLID-LIQUID SEPARATION FILTRATION RATE (m³/m²·hr) | FREE WATER (%) | RESIDUE COMPOSITION ||||||
|---|---|---|---|---|---|---|---|---|---|
| | | | | Ga % | Al % | Fe ppm | Zn % | Na % | K % |
| SULFURIC ACID | 6~7 | 0.3 | 76.7 | 16.4 | 17 | 988 | 2.60 | 3.93 | 0.55 |
| SULFURIC ACID | 1~4 | 7.2 | 19.9 | 26.9 | 3.27 | 107 | 0.66 | 1.24 | 5.30 |

FIG.9

LEACHING OF Ga-CONCENTRATED RESIDUE (ALKALI LEACHING)

TABLE 13. LEACHING CONDITIONS :

| PULP CONCENTRATION | 200 g/L |
|---|---|
| CAUSTIC SODA CONTENT | 150 g/L |
| REACTION TIME | 1 Hr |
| SOLUTION TEMPERATURE | 80°C |

TABLE 14. LEACHED SOLUTION : (= INITIAL ELECTROLYSIS SOLUTION)

| [Ga] | 55 g/L |
|---|---|
| [Al] | 14 g/L |
| [Zn] | 450 mg/L |
| [Fe] | 2 mg/L |
| [In] | 2 mg/L |
| pH | 13 OR HIGHER |

FIG.10

ELECTROWINNING

TABLE 15. ELECTROLYSIS CONDITIONS:

| SOLUTION TEMPERATURE | 50°C |
|---|---|
| ELECTRODE PLATE | SUS |
| CURRENT DENSITY | 500 A/m² |
| CELL VOLTAGE | 3.7 V |

RESULTS: CURRENT EFFICIENCY    25~50 %

Ga CONCENTRATION IN SPENT SOLUTION    12 g/L

TABLE 16. COMPOSITION OF EXTRACTED METALLIC Ga (FOLLOWING ACID WASH)

| Al | < 1 ppm |
|---|---|
| Fe | < 5 ppm |
| Ni | < 1 ppm |
| Zn | < 10 ppm |
| Ge | 2 ppm |
| In | 22 ppm |
| Sn | 4 ppm |
| Pb | < 1 ppm |

FIG.11

TABLE 17. RECOVERY PERCENTAGE

| NAME OF STEP | YIELD | NOTES |
|---|---|---|
| JAROSITE FORMATION | 96.1% | LOSS TO POST-JAROSITE SOLUTION |
| JAROSITE LEACHING | 98.0% | LOSS TO IRON HYDROXIDE |
| PURIFICATION | 97.0% | LOSS TO PURIFIED RESIDUE |
| NEUTRALIZATION | 99.0% | LOSS TO POST-NEUTRALIZATION SOLUTION |
| ALKALI LEACHING | 99.9% | LOSS TO ALKALI LEACH RESIDUE |
| TOTAL RECOVERY | 90.3% | |

GALLIUM AND/OR INDIUM SEPARATION AND CONCENTRATION METHOD

BACKGROUND OF THE INVENTION

1. Field of the Invention

The present invention relates to a method for separating and concentrating gallium or indium from gallium- and indium-containing solutions.

2. Description of the Related Art

Gallium, which is a metal element obtained in trace amounts as a byproduct of zinc or aluminum smelting, is widely used in compound semiconductors. In the field of compound semiconductors, high purity gallium purified to 6N (99.9999%) or higher is used in the production of GaAs, and GaP, which are, in turn, used for light-emitting diodes, ICs, LSIs, and the like. Similar to gallium, indium is a metal element obtained in trace amounts as a byproduct of zinc or aluminum smelting and mostly used as ITO to form transparent electrode films for liquid crystals.

In conventional practice, ion exchange, solvent extraction, and other techniques are used to selectively separate gallium and indium from solutions containing traces of gallium and indium, and to concentrate these elements. For example, the method disclosed in Japanese Unexamined Patent Application (Kokai) 59-193230 is known as such an ion-exchange technique. According to this technique, a solution containing traces of gallium and indium is passed through a layer of chelating ion-exchange resin under an appropriate pH, the gallium and indium are selectively adsorbed, and these elements are then eluted using a mineral acid.

The following method is also well known as solvent extraction technique: a carboxylic acid-based or phosphoric acid-based chelate extraction chemical is added to an organic solvent, the pH of the aqueous phase is adjusted, and the product is brought into close contact with the aforementioned organic solvent, whereby the gallium and indium in the aqueous phase are selectively extracted as chelates into the organic phase.

The above-described ion-exchange technique, however, requires resin columns and other bulky equipment, irrespective of the recovery volume of gallium and indium. This technique is also disadvantageous in that when large amounts of iron, aluminum, and other impurities are present, failure to remove them in advance will lower the removal efficiency of the resin, block the resin column, and the like.

Solvent extraction is disadvantageous in that large amounts of organic chelating agents and organic solvents are needed for the reactions, so high running costs are incurred and explosion-proof equipment must be used because of safety considerations, resulting in much higher costs in terms of initial investment.

Thus, all these conventional methods are difficult to integrate into future industries in terms of cost, and recovery of trace amounts of gallium and indium at minimal cost is desired.

SUMMARY OF THE INVENTION

It is an object of the present invention to make it possible to recover gallium and indium efficiently and at a low cost from solutions containing traces of gallium and indium.

A distinctive feature of the present invention is that, in order to attain the stated object, gallium-containing jarosite is formed from a solution containing at least gallium, and the gallium is separated from other components and concentrated by dividing the jarosite into solid and liquid fractions.

Another distinctive feature of the present invention is that gallium-containing jarosite is formed from a solution containing at least gallium, and the gallium is separated from other components and concentrated by adding an alkali to the jarosite and leaching the material.

Yet another distinctive feature of the present invention is that gallium- and indium-containing jarosite is formed from a gallium- and indium-containing solution, and the gallium and indium are separated from other components and concentrated by dividing the jarosite into solid and liquid fractions.

Still another distinctive feature of the present invention is that gallium and indium are separated from other components and concentrated by means of the following steps:

a first step, in which one or more of iron(III) ions, sulfate ions, and monovalent cations are optionally added to a solution containing traces of gallium and indium to form a solution containing iron(III) ions, sulfate ions, and monovalent cations; and a mineral acid or an alkali reagent is optionally added to this solution to adjust the pH to 2–4;

a second step, in which the temperature of the solution obtained in the first step is raised to 70–100° C. under vigorous agitation, the system is allowed to react for 10 to 24 hours to give jarosite, and the gallium and indium are coprecipitated with jarosite particles; and a third step, in which the reaction product obtained in the second step is divided into solid and liquid fractions, and the gallium- and indium-containing jarosite is recovered.

DESCRIPTION OF THE PREFERRED EMBODIMENTS

Figure 1:
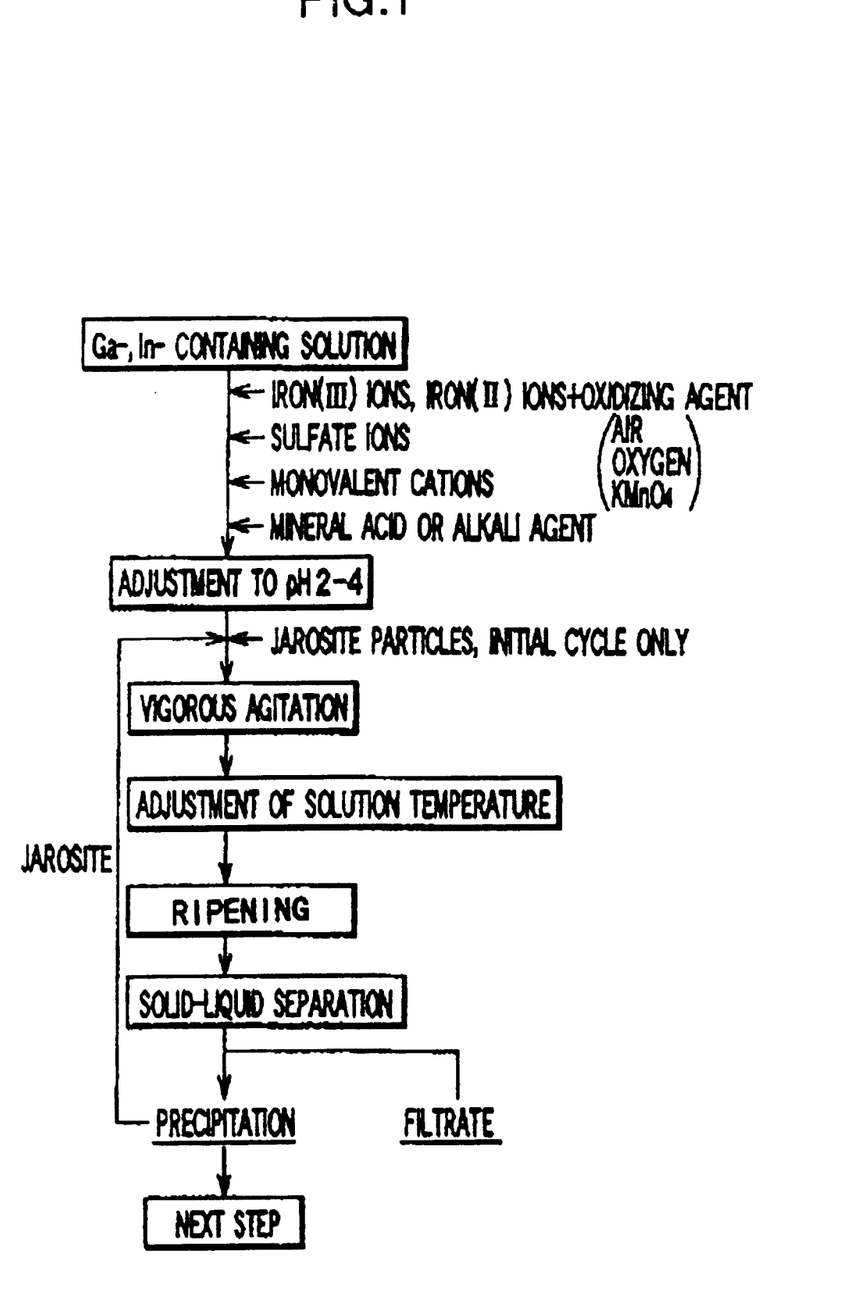
FIG. 1 is a flowchart depicting the overall progress of a method for separating and concentrating gallium and indium in a solution in accordance with an embodiment of the present invention.

FIG. 1 is a flowchart depicting the overall progress of a method for separating and concentrating gallium and indium in a solution in accordance with an embodiment of the present invention. Following is a description, given with reference to FIG. 1, of the manner in which gallium and indium in a solution are separated and concentrated in accordance with an embodiment of the present invention. This embodiment is described with reference to an example in which the solution obtained during the zinc leached residue treatment step of hydrometal logic zinc refining is used as a solution containing traces of gallium and indium.

The method of this embodiment comprises (1) a first step for adjusting the solution containing traces of gallium and indium to a pH of 2 to 4, (2) a second step for reacting the solution obtained in the first step to precipitate gallium and indium together with jarosite particles, and (3) a third step for separating as a solid the reaction product obtained in the second step, and recovering the gallium- and indium-containing jarosite. As used herein, the term "jarosite" refers to a substance expressed by the chemical formula (where M is a monovalent cation).

(1) First Step (pH Adjustment Step)

In this step, an alkali agent or a mineral acid is added to the solution containing traces of gallium and indium to adjust its pH to 2–4. Here, the solution containing traces of gallium and indium is, above mentioned, the solution obtained during a zinc leached residue treatment step of the hydrometal lugic zinc refining.

Iron(III) ions, sulfate ions, and monovalent cations are commonly added to the solution containing gallium, indium. These components are important structural elements of jarosite. The present invention involves forming jarosite, which is an iron oxide, and coprecipitating jarosite particles with gallium and indium. It is common knowledge that when an iron(III) ion precipitate is deposited from a weakly acidic solution, the gallium and indium ions present in trace amounts in the solution are captured by the precipitate and separated from the solution. The present invention is based on the fact that gallium and indium can be selectively precipitated and adequately separated/concentrated through the use of jarosite as the iron(III) ion precipitate.

Iron(III) ions, sulfate ions, and monovalent cations (Na$^+$, K$^+$, NH$_4^+$, and the like), which are structural elements of jarosite, must first be added to the solution in an amount equal to or greater than a specific proportion. These must therefore be replenished as needed to maintain their content at a specific level. The content of iron(III) ions in the solution should preferably be 0.2–5 g/L. If the content is less than 0.2 g/L, the collection efficiency of the gallium and indium ions present in trace amounts in the solution falls below 60% for gallium ions, and if the content exceeds 5 g/L, the effect remains the same, and an incommensurate increase in costs results.

The sulfate ion content, which depends on the iron(III) content, should be 0.2 g/L or higher. The content of monovalent cations should be 0.01 to 0.1 mol/L, which is 5 to 10 times the theoretical amount of the above-described chemical formula.

The pH of the solution is important for forming a jarosite precipitate. The pH of the solution should preferably be 2 to 4. When the pH is greater than 4, elements other than gallium and indium ions (that is, aluminum, zinc, and other impurities) precipitate together with the iron precipitate, making it impossible to separate gallium and indium from these impurities. When pH is less than 2, a precipitate composed of iron alone forms, and gallium and indium cannot be coprecipitated.

(2) Coprecipitation Step (Second Step)

Jarosite is formed by heating and ripening. Specifically, the solution is heated to 70–100° C. under vigorous agitation. The solution is then reacted and cured for 10 to 24 hours in this state. If the temperature is too low in this case, the jarosite does not form, iron(III) hydroxide is produced, and filterability is adversely affected. If the reaction time is too short, the rate of coprecipitation of gallium into the jarosite becomes inadequate.

Jarosite can be produced in a shorter reaction time (2 to 6 hours) when separately prepared jarosite particles are added to the reaction layer in a pulp concentration of 50–150 g/L. These separately prepared jarosite particles are added solely at the start of treatment. After the treatment has been started and jarosite recovered in the third step, part of the jarosite recovered in the third step is added back. Such addition is repeated in order to set the gallium and indium concentration in the gallium- and indium-containing jarosite obtained in the third step to a level of 1–5% for each element.

(3) Jarosite Recovery Step (Third Step)

In the third step, the reaction product of the second step undergoes solid-liquid separation in a thickener or the like, the resulting solution is discharged, and the gallium- and indium-containing jarosite is recovered. With the exception of the portion recirculated to the second step in the manner described above, the recovered jarosite is fed to an alkali leaching step or SO$_2$ reductive leaching step.

Following is a description of specific examples in which gallium and indium were separated and concentrated by the above-described method for separating and concentrating gallium and indium.

EXAMPLE 1

A solution obtained by leaching gypsum (produced by the zinc leached residue treatment step of zinc refining) and removing most of the indium in advance was used as the solution containing traces of gallium and indium. The primary components were gallium (100 mg/L) and indium (100 mg/L), and 30-g/L zinc and 15-g/L aluminum were contained as impurities.

The solution was acidic due to sulfuric acid, so no sulfate ions were added, K$^+$ (monovalent cations) were added in an amount of 2.5 g/L (0.06 mol/L), iron(III) ions were added in two amounts (0.2 g/L and 4.0 g/L), and each solution was introduced into a stirred reaction tank.

Figure 2:
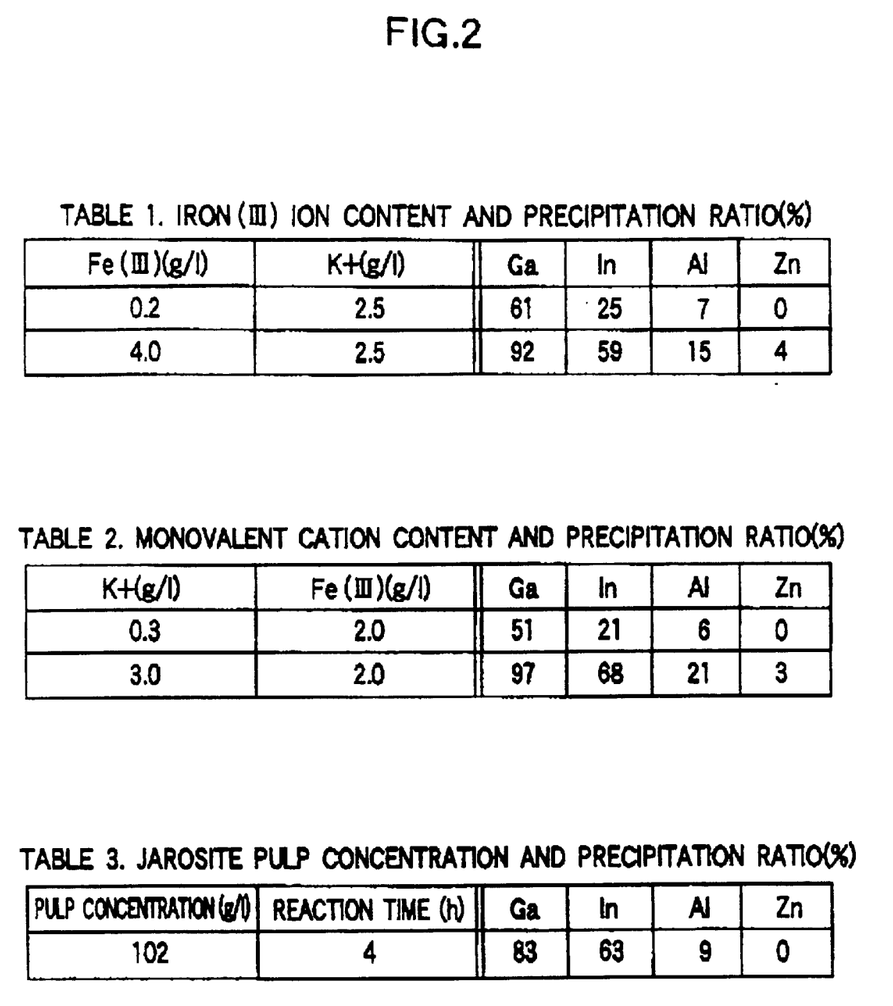
FIG. 2 is a diagram depicting in tabular form the precipitation ratio and the like obtained in a typical example involving jarosite formation.

The pH of the aforementioned two solutions was adjusted to 3.0 with calcium carbonate, the solutions were vigorously agitated, the temperature was raised to 90° C., and a reaction was conducted in this state for 24 hours. The reaction product was filtered and precipitated; the gallium, indium, and impurities (aluminum and zinc) in the filtrate were quantified, and the precipitation ratio of each was determined. The results are shown in Table 1 (FIG. 2).

EXAMPLE 2

The same solution as in Example 1 was used, the concentration of iron(III) ions was set to 2 g/L, the concentration of monovalent cations (K$^+$) was set to 0.3 g/L (0.008 mol/L) or 3.0 g/L (0.08 mol/L), and the same procedures as in Example 1 were performed in each case. The corresponding precipitation ratios are shown in Table 2 (FIG. 2).

EXAMPLE 3

Iron(III) ions and K$^+$ were added to the same solution as in Example 1 in concentrations of 0.5 g/L and 0.7 g/L (0.018 mol/L), respectively, and the solution was introduced into a stirred reaction tank. The pH of the solution was adjusted to 3.0 with calcium carbonate, separately prepared jarosite particles were added in a pulp concentration of 102 g/L, the temperature was raised to 90° C., and a reaction was conducted in this state for 4 hours. The reaction product was filtered and precipitated; the gallium, indium, and impurities (aluminum and zinc) in the filtrate were quantified, and the precipitation ratio of each was determined. The results are shown in Table 3 (FIG. 2).

Following is an example of a gallium separation and concentration method pertaining to another embodiment of the present invention. Until a certain intermediate step, the gallium separation and concentration method pertaining to this embodiment is performed in exactly the same manner as the gallium/indium separation and concentration method pertaining to the previously described embodiment. In more-simple terms, this separation and concentration method first involves forming jarosite from a gallium-containing solution. This jarosite is subsequently leached by the addition of an alkali. The previously described gallium/indium separation and concentration method is performed completely unchanged as this jarosite production method.

Figure 3:
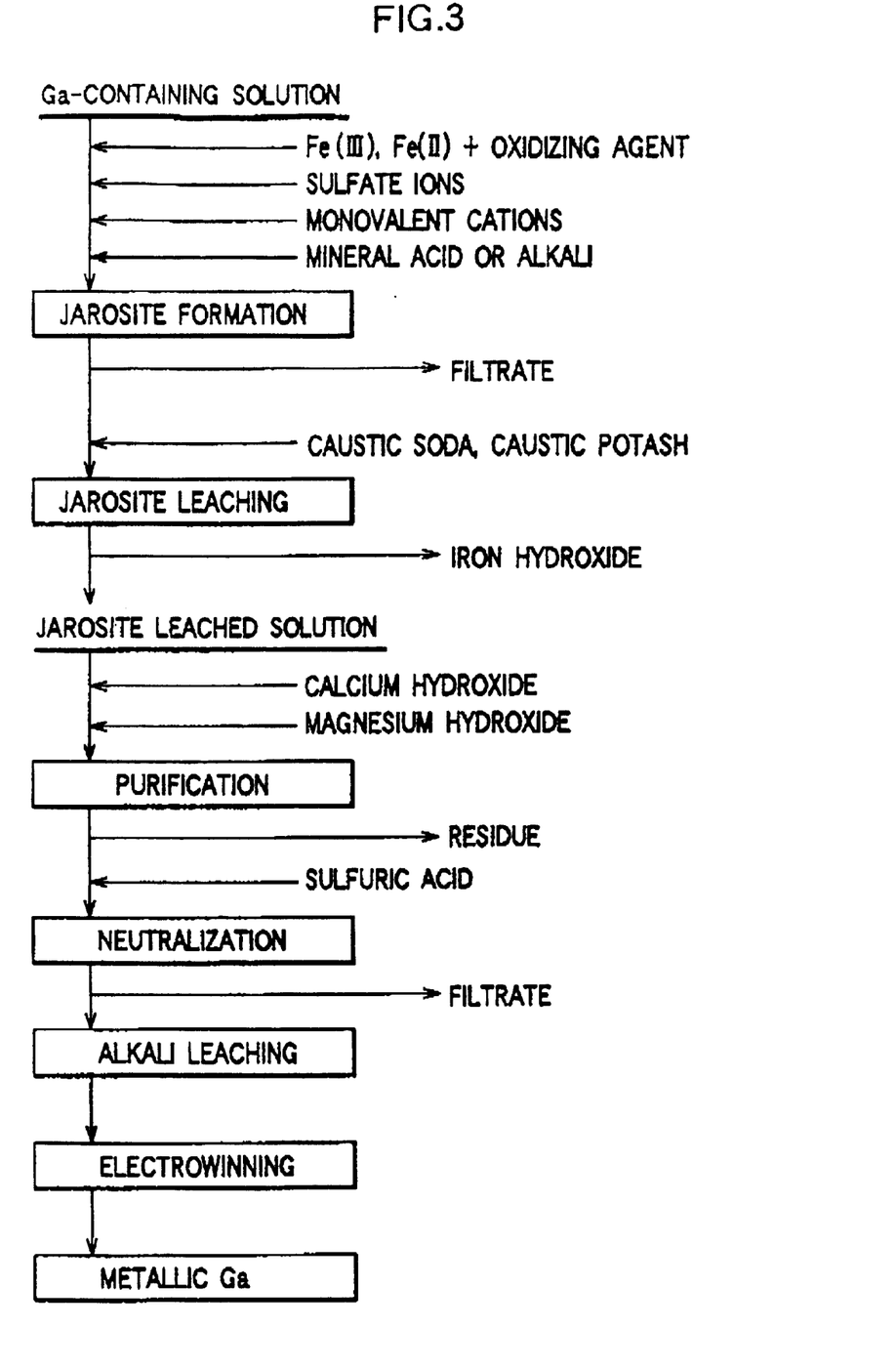
FIG. 3 is a flowchart depicting the overall progress of a method for separating and concentrating gallium in accordance with another embodiment of the present invention.

FIG. 3 is a flowchart depicting the steps of the method for separating and concentrating gallium in accordance with this embodiment. The steps from "gallium-containing solution" to "jarosite production" in FIG. 3 are the same as the steps in the area enclosed within the dotted line in FIG. 1. The method for separating and concentrating gallium in accordance with this embodiment will now be described with reference to FIG. 3.

The method of this embodiment comprises (1) a first step (jarosite production step) for producing jarosite from a gallium-containing solution and dividing the jarosite into solid and liquid fractions, (2) a second step (alkali leaching step) for leaching the jarosite by the addition of an alkali and removing iron hydroxide from the jarosite leached solution, (3) a third step (purification step) for purifying the jarosite leached solution by adding calcium hydroxide or magnesium hydroxide and removing the purified residue, (4) a fourth step (neutralization step) for adding sulfuric acid to the solution, performing neutralization, and precipitating basic gallium sulfate, (5) a fifth step (second alkali leaching step) for recovering the precipitate and performing alkali leaching, and (6) a sixth step (electrowinning step) for the electrowinning of gallium from the leached solution.

(1) First Step (Jarosite Production Step)

As noted above, this step extends from the "gallium-containing solution" to "jarosite production" in FIG. 3, contains a process for dividing the resulting jarosite into solid and liquid fractions, and is the same as the steps in the area enclosed within the dotted line in FIG. 1.

(2) Second Step (Alkali Leaching Step)

In this step, the jarosite produced in the above-described first step is leached by the addition of an alkali, and iron hydroxide is removed from the jarosite leached solution. Caustic soda or caustic alkali is used as the alkali.

Specifically, caustic soda having a specific minimum concentration (150 g/L) is added to the jarosite obtained in the first step, and the product is leached for 0.5 hour or longer at a temperature (60° C. or higher) above a specific temperature. Because iron, which is a principal component of jarosite, forms iron hydroxide or another poorly soluble precipitate as a result of such leaching, iron and gallium can be readily separated by filtration.

In this case, the indium present in the jarosite together with gallium does not dissolve in the solution at higher pH values (about 13), so the metals dissolved in the alkali leached solution are limited to gallium and jarosite impurities (aluminum, zinc, and the like).

The leaching ratio of the gallium-containing jarosite is limited to about 60% when reductive leaching rather than alkali leaching is performed using sulfuric acid, hydrochloric acid, sulfurous acid gas, or the like, so large amounts of iron are contained as impurities in the leached solution.

Figure 4:
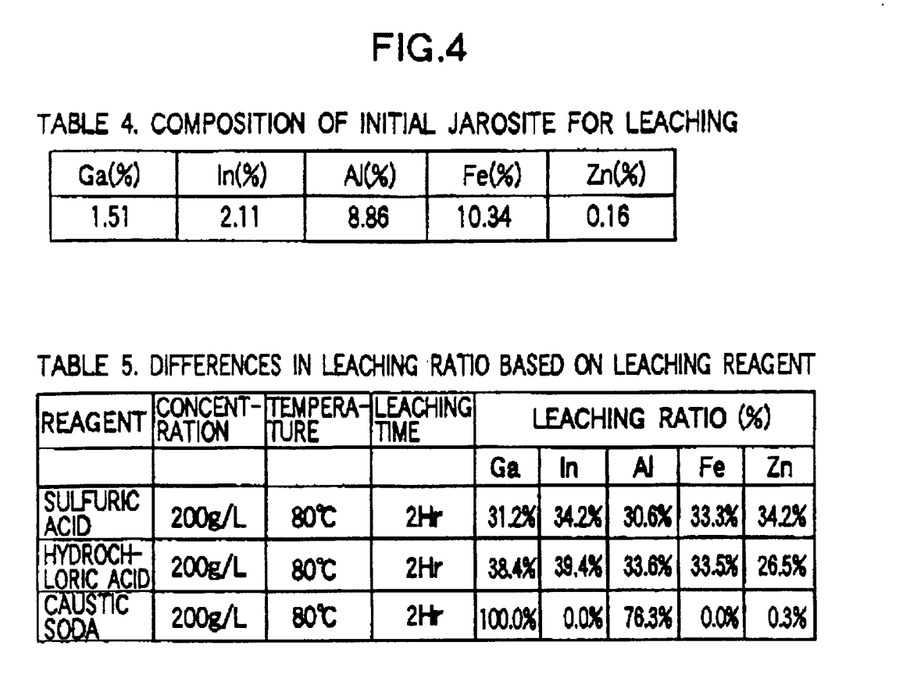
FIG. 4 is a diagram depicting in tabular form results obtained by leaching a jarosite of a specific grade with sulfuric acid, hydrochloric acid (comparisons), and caustic soda (present invention) having specific concentrations.

FIG. 4 is a diagram depicting in tabular form results obtained by leaching a jarosite of a specific grade with sulfuric acid, hydrochloric acid (comparisons), and caustic soda (present invention) having specific concentrations. It can be seen in the figure that adding caustic soda with a concentration of 200 g/L to jarosite (Ga=1.51%, In=2.11%, Al=8.86%, Fe=10.34%, Zn=0.16%) and leaching it for 2 hours at 80° C. leaches 100% of gallium, 76.3% of aluminum, and 0.3% of zinc, but the leaching ratio of iron or indium is 0%. Iron and indium can thus be removed.

(3) Third Step (Purifying Step)

In this step, calcium hydroxide or magnesium hydroxide is added to the jarosite leached solution to precipitate out aluminum and zinc or germanium. Specifically, the leached solution obtained in the second step contains, in addition to gallium, a trace amount of zinc and a comparatively large amount of aluminum as impurities. Adding calcium hydroxide to this solution (pH: approximately 13) causes the aluminum and zinc in the solution to solidify and precipitate.

Filtering the pulp after the addition of calcium hydroxide allows a solution containing only gallium to be obtained. Aluminum and zinc are removed at this stage for the following reasons. Specifically, the alkali-leached solution undergoes neutralization in the next step to concentrate gallium, and the presence of aluminum and zinc contaminants in the solution at this stage increases the amount of neutralization residue and drives up the cost of equipment and chemicals.

If germanium is contained in the alkali leached solution, this germanium can be removed by the addition of magnesium hydroxide. Calcium hydroxide and magnesium hydroxide cannot form a poorly soluble precipitate with gallium, and can thus be used in the above-described method for purifying an alkaline gallium solution.

Figure 5:
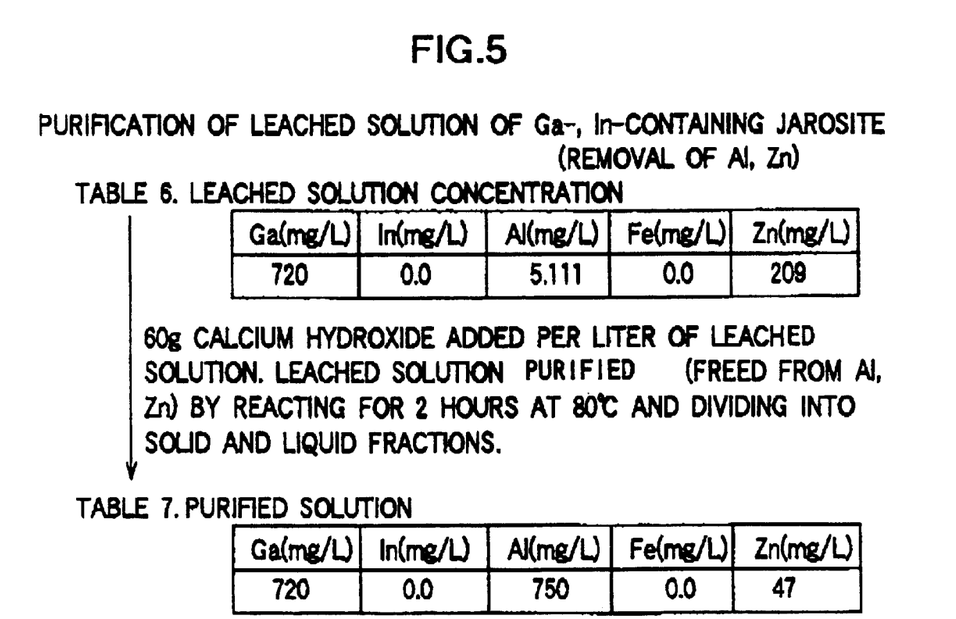
FIG. 5 is a diagram depicting in tabular form results obtained by adding calcium hydroxide in a specific proportion to a jarosite leached solution having a specific composition.

FIG. 5 is a diagram depicting in tabular form results obtained by adding calcium hydroxide in a specific proportion to a jarosite leached solution having a specific composition. It can be seen from Tables 6 and 7 in FIG. 5 that when calcium hydroxide is added in an amount of 60 g per liter of jarosite leached solution (Ga: 720 mg/L; In: 0.0 mg/L; Al: 5111 mg/L; Fe: 0.0 mg/L; Zn: 209 mg/L), a reaction is allowed to occur for 2 hours at 80° C., and the product is divided into a solid and liquid fractions, the purified solution contains 720 mg/L Ga, 0.0 mg/L In, 750 mg/L Al, 0.0 mg/L Fe, and 47 mg/L Zn. Aluminum and zinc can thus be efficiently removed.

Figure 6:
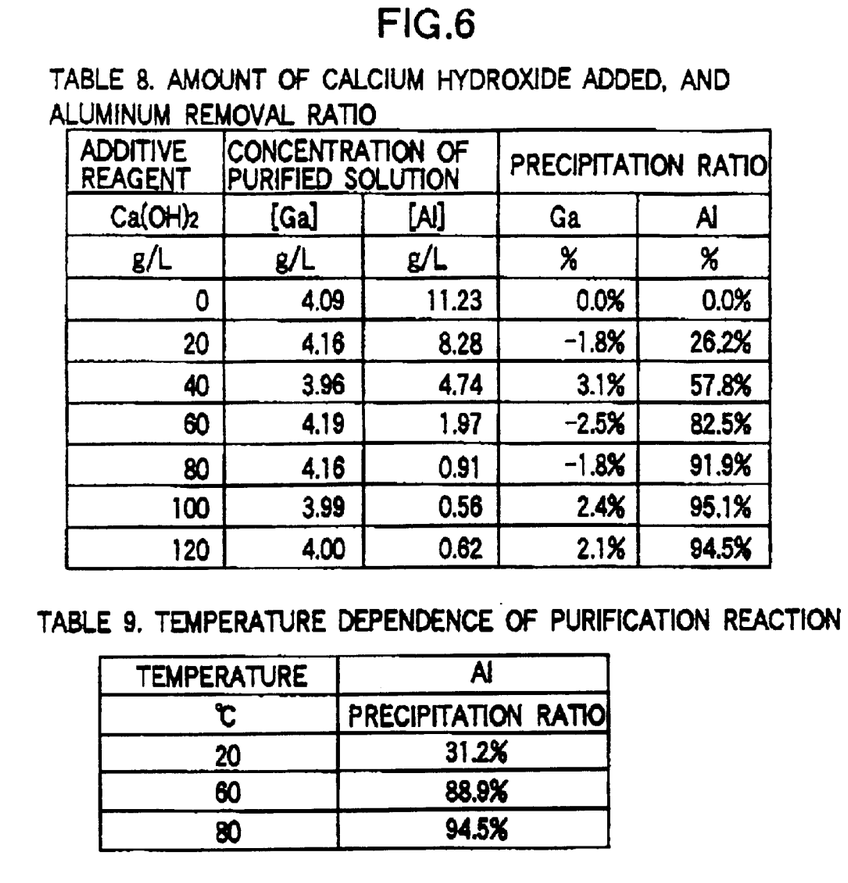
FIG. 6 is a table depicting the results of a study into the aluminum removal ratio and the temperature dependence of the reaction at varying amounts of calcium hydroxide added.

FIG. 6 is a table depicting the results of a study into the aluminum removal ratio and the temperature dependence of the reaction at varying amounts of calcium hydroxide added. Table 8 in FIG. 6 depicts the aluminum removal ratio at varying amounts of calcium hydroxide added, and Table 9 depicts the temperature dependence of the reaction during the addition of calcium hydroxide. It can be seen in the tables that the greater the amount of calcium hydroxide added, the higher the aluminum removal ratio, and that this removal ratio is 80% or higher when calcium hydroxide is added in an amount greater than 60 g per liter of jarosite leached solution. It can also be seen that the temperature during the reaction must be 60° C. or higher.

Figure 7:
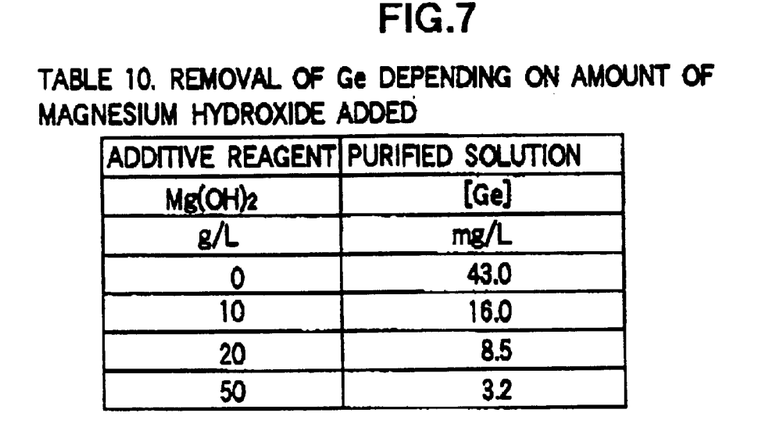
FIG. 7 is a diagram depicting in tabular form the germanium removal effect at varying amounts of magnesium hydroxide added to the jarosite leached solution.

FIG. 7 is a diagram depicting in tabular form the germanium removal effect at varying amounts of magnesium hydroxide added to the jarosite leached solution. The greater the amount in which magnesium hydroxide is added, the higher the germanium removal ratio. A marked removal effect is achieved when the amount in which magnesium hydroxide is added exceeds 20 g per liter of jarosite leached solution.

(4) Fourth Step (Neutralization Step)

In this step, sulfuric acid is added to the solution purified in the aforementioned third step, neutralization is performed, and basic gallium sulfate is precipitated (a precipitate is formed). Here, dissolved gallium ($Ga(OH)_4^-$ ions) precipitates as gallium hydroxide ($Ga(OH)_3$) if sulfuric acid or the like is added to the dealuminized alkaline solution and the pH is gradually lowered. It should be noted that gallium hydroxide is a substance that has low crystallinity and high moisture content, and considerable time and much energy are therefore needed to filter this substance. In addition, the high moisture content of the resulting gallium hydroxide makes it impossible to raise the gallium content of the initial solution obtained by electrowinning during a subsequent step.

During neutralization, the pH is reduced (to 2–3) below the gallium hydroxide precipitation region (pH=5–10), and the $Ga(OH)_4^-$ ions are converted to $Ga^{3+}$ and dissolved on the acidic side. Heating the solution to 80–90° C. causes highly crystalline basic gallium ($KGa_3(OH)_6(SO_4)_2$ and the like) to precipitate. Monovalent cations ($K^+$, $Na^+$, $NH_4^+$, and the like) and sulfate ions are needed for this reaction. Consequently, gallium sulfate is added prior to heating if these are absent from the initial solution. This operation can improve the filterability of the neutralization residue and lower the moisture content.

Figure 8:
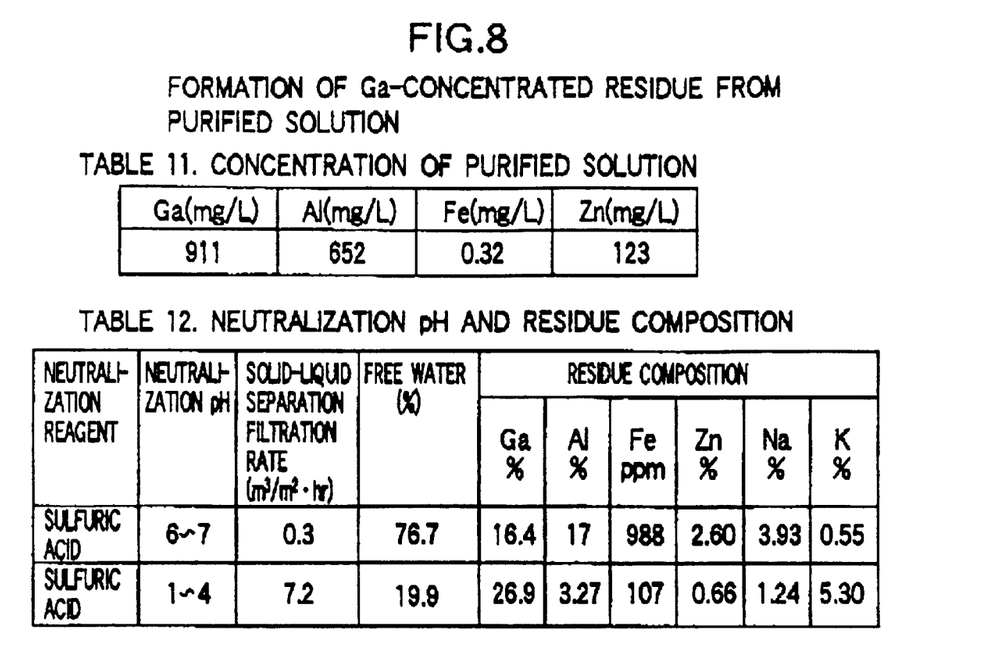
FIG. 8 is a diagram depicting in tabular form the composition of the purified solution used as a starting solution for neutralization, and the composition of the residue obtained when neutralization is performed at varying pH values during neutralization.

FIG. 8 is a diagram depicting in tabular form the composition of the purified solution used as a starting solution for neutralization, and the composition of the residue obtained when neutralization is performed at varying pH values during neutralization. As is evident from Table 12 in FIG. 8, higher residue grades are obtained at a pH of 1–4 than at a pH of 6–7.

(5) Fifth Step (Second Alkali Leaching Step)

Figure 9:
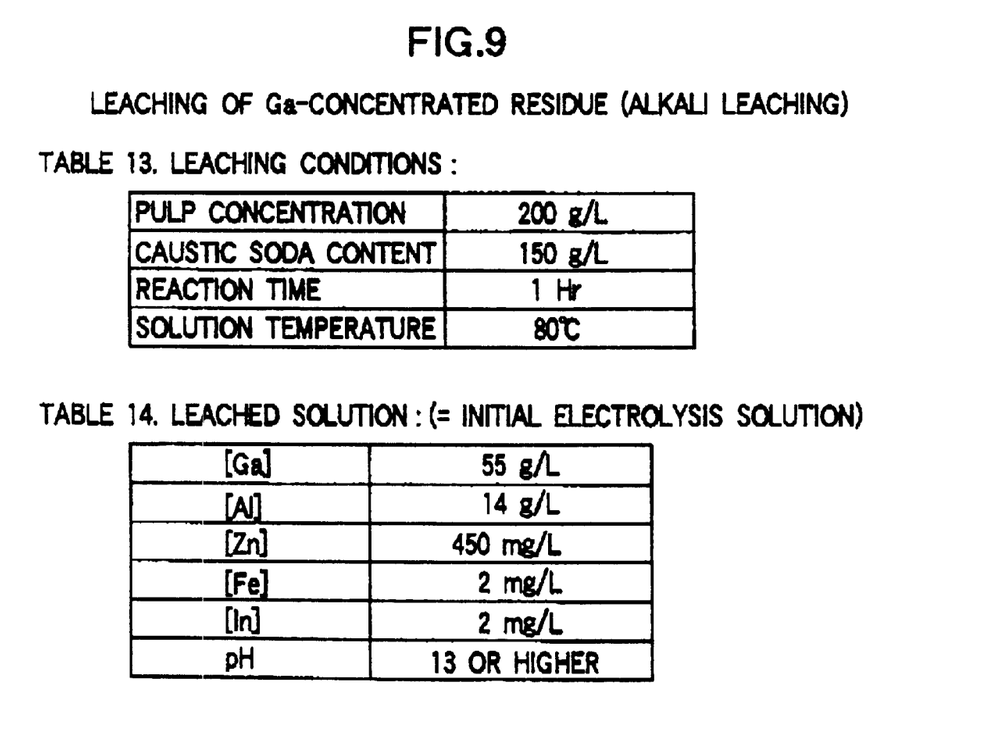
FIG. 9 is a diagram depicting in tabular form the conditions of second alkali leaching and the composition of the leached solution.

In this step, the precipitate obtained in the fourth step is recovered and subjected to alkali leaching. FIG. 9 is a diagram depicting in tabular form the conditions of the second alkali leaching and the composition of the leached solution. As is evident from Table 13 in FIG. 9, the leaching process involves adding 150 g caustic soda per liter of the concentrated residue (pulp concentration: 200 g/L) obtained in the fourth step, setting the solution temperature to 80° C., and performing leaching for 1 hour. As a result, the leached solution contains 55 g/L Ga, 14 g/L Al, 450 mg/L Zn, 2 mg/L Fe, and 2 mg/L In (as shown in Table 14), and the pH becomes 13 or higher. The solution thus obtained serves as a starting solution for the electrolysis in the next step.

(6) Sixth Step (Electrowinning Step)

In this step, gallium is electrolytically extracted from the solution obtained in the fifth step. During this electrowinning, the gallium content of the starting electrolyte solution is set to 50–150 g/L, the temperature of the electrolyte solution is kept at 50 to 60° C., and a current is passed between SUS electrode plates (anode and cathode) at a current density of 500 to 1000 $A/m^2$. Metallic gallium is deposited on the cathode as a result, but because the melting point of gallium is 29.6° C., it precipitates as liquid gallium on the bottom of the electrolytic cell.

Figure 10:
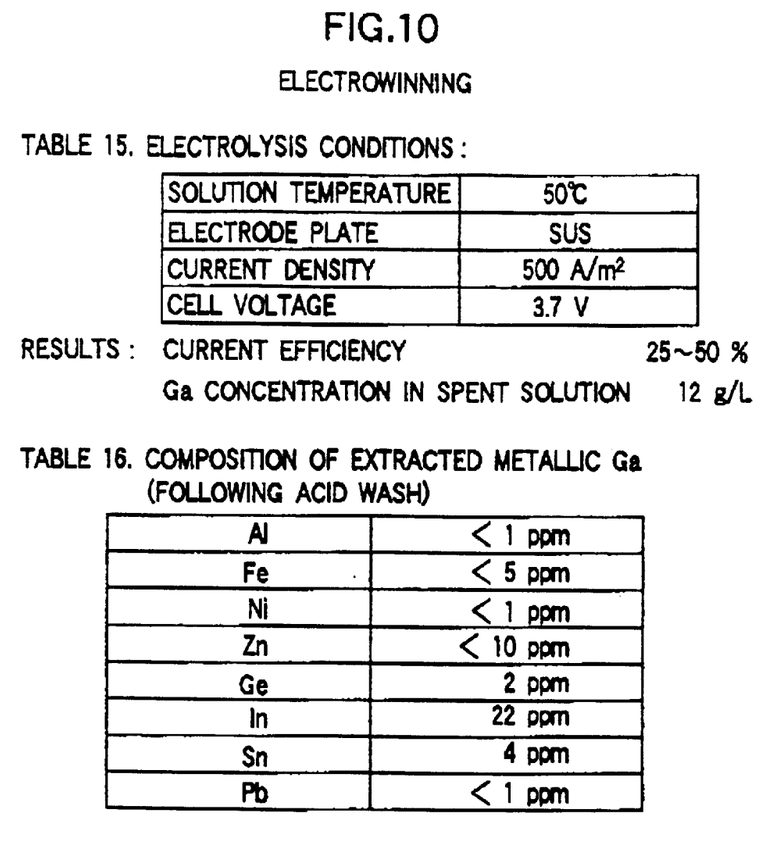
FIG. 10 is a diagram depicting in tabular form electrolysis conditions and the composition of extracted metallic gallium in an example involving electrowinning.

FIG. 10 is a diagram depicting in tabular form the electrolysis conditions and the composition of extracted metallic gallium in an example involving electrowinning. As is evident from Table 15 in FIG. 10, the electrolysis conditions correspond to a solution temperature of 50° C., a current density of 500 $A/m^2$, and a cell voltage of 3.7 V. As can be seen in Table 16, the resulting high-grade metallic gallium contains 1 ppm or less Al, 5 ppm or less Fe, 1 ppm or less Ni, 10 ppm or less Zn, 2 ppm Ge, 22 ppm In, 4 ppm Sn, and 1 ppm or less Pb.

Figure 11:
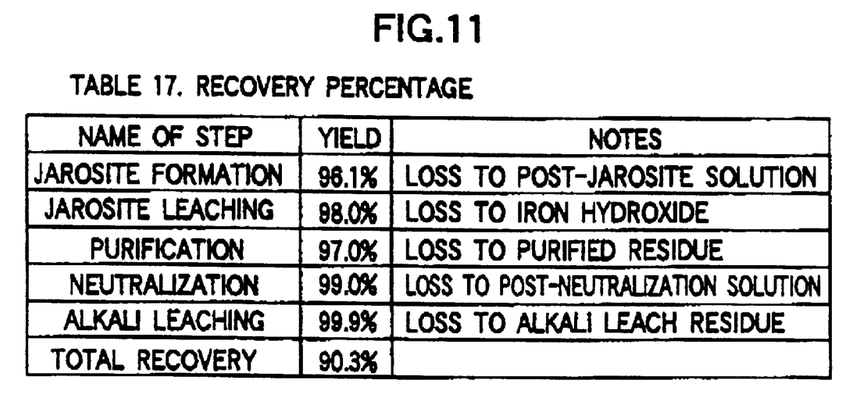
FIG. 11 is a diagram depicting in tabular form the recovery percentage for each of the steps comprising a gallium separation and concentration method performed in accordance with an embodiment.

FIG. 11 is a diagram depicting in tabular form the recovery percentage for each of the steps comprising the gallium separation and concentration method performed in accordance with the above-described embodiment. The recovery percentage of each step is very high, and the total recovery is 90.3%, providing exceptional value.

What is claimed is:

1. A method for separating and concentrating gallium from a gallium-containing solution, comprising forming gallium-containing jarosite in said solution; separating the gallium-containing jarosite from other components of the solution and concentrating the gallium by dividing the jarosite-containing solution into solid and liquid fractions; and separating the gallium from other components of the gallium-containing jarosite.

2. A method for separating and concentrating gallium from a gallium-containing solution, comprising forming gallium-containing jarosite in said solution, and separating gallium from other components of the gallium-containing jarosite and concentrating the gallium by adding an alkali to, and leaching, the gallium-containing jarosite.

3. A method for separating gallium from other components of a gallium-containing jarosite and concentrating the gallium, said method comprising:

adding an alkali to, and leaching, a gallium-containing jarosite to form a leached solution, which contains gallium, thereby separating at least iron from the gallium; and adding calcium hydroxide to the leached solution, thereby separating at least aluminum from the gallium.

4. A method for separating gallium from other components of a gallium-containing jarosite and concentrating the gallium, said method comprising:

adding an alkali to, and leaching, a gallium-containing jarosite to form a leached solution, which contains gallium, thereby separating at least iron from the gallium; and adding magnesium hydroxide to the leached solution, thereby separating at least germanium from the gallium.

5. A method for separating gallium from other components of a gallium-containing jarosite and concentrating the gallium, said method comprising:

adding an alkali to, and leaching, a gallium-containing jarosite to form a leached solution, which contains gallium, thereby separating at least iron from the gallium;

adding calcium hydroxide to the leached solution to form a dealuminized product, which contains gallium, thereby separating at least aluminum from the gallium; and adding an acid to said dealuminized product to cause gallium compounds to precipitate.

6. A method as defined in claim 5, wherein, during the precipitation of gallium compounds, the pH is kept below the pH at which gallium hydroxide precipitates.

7. A method as defined in claim 5, wherein said acid is sulfuric acid, and, during the precipitation of gallium compounds, the pH is kept below the pH at which gallium hydroxide precipitates, so as to precipitate basic gallium sulfate.

8. A method for separating gallium and indium from other components of a solution containing traces of gallium and indium and concentrating the gallium and indium, said method comprising:

a first step in which it is determined if the solution contains iron(III) ions, sulfate ions, and monovalent cations and, if not already present in sufficient amounts to form a jarosite, one or more of iron(III) ions, sulfate ions, and monovalent cations are added to said solution to form a solution containing iron(III) ions, sulfate ions, and monovalent cations, and in which the pH of the solution is determined and, if the pH is not from 2–4, a mineral acid or an alkali reagent is added to said solution to adjust the pH to 2–4;

a second step in which the temperature of the solution obtained in the first step is raised to 70–100° C. under vigorous agitation, and the solution is allowed to react for 10 to 24 hours to provide jarosite in said solution, wherein the gallium and indium are coprecipitated with jarosite particles; and a third step in which the jarosite-containing solution obtained in the second step is divided into solid and liquid fractions, and the gallium- and indium-containing jarosite is recovered.

9. A method as defined in claim 8, wherein separately prepared jarosite particles are added in a pulp concentration of 50 to 150 g/L during said second step.

10. A method as defined in claim 8, wherein, after completion of the third step, the first to third steps are repeated at least once; at least part of the gallium- and indium-containing jarosite recovered in a preceding third step is added during a subsequently performed second step; and the addition of said jarosite to a subsequently performed second step is repeated in order to provide a jarosite having a gallium and indium content of 1–5 wt %.

11. A method as defined in claim 8, wherein, in the first step, the concentrations of iron(III) ions, sulfate ions, and monovalent cations are adjusted to 0.2–5 g/L, 0.2 g/L or higher, and 0.01–0.1 mol/L, respectively.

12. A method as defined in claim 8, wherein said monovalent cations include one or more of $Na^+$, $K^+$, and $NH_4^+$.

* * * * *